(12) United States Patent
Xu et al.

(10) Patent No.: US 12,063,594 B2
(45) Date of Patent: *Aug. 13, 2024

(54) METHOD, DEVICE, AND SYSTEM FOR DEPLOYING NETWORK SLICE

(71) Applicant: HUAWEI TECHNOLOGIES CO., LTD., Shenzhen (CN)

(72) Inventors: Ruiyue Xu, Shanghai (CN); Kai Zhang, Shanghai (CN); Yan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,406

(22) Filed: Oct. 19, 2022

(65) Prior Publication Data
US 2023/0041039 A1 Feb. 9, 2023

Related U.S. Application Data

(63) Continuation of application No. 16/750,633, filed on Jan. 23, 2020, now Pat. No. 11,490,327, which is a
(Continued)

(30) Foreign Application Priority Data

Jul. 31, 2017 (CN) .......................... 201710642648.2

(51) Int. Cl.
*H04W 48/18* (2009.01)
*H04L 12/46* (2006.01)
(Continued)

(52) U.S. Cl.
CPC ......... *H04W 48/18* (2013.01); *H04L 12/4641* (2013.01); *H04L 41/0893* (2013.01); *H04W 28/0231* (2013.01); *H04W 84/042* (2013.01)

(58) Field of Classification Search
CPC .............. H04W 48/18; H04W 28/0231; H04L 41/0893
See application file for complete search history.

(56) References Cited

U.S. PATENT DOCUMENTS 11,490,327 B2 * 11/2022 Xu ........................ H04W 48/18
2016/0352924 A1 12/2016 Senarath et al.
(Continued)

FOREIGN PATENT DOCUMENTS

| CN | 106657194 A | 5/2017 |
|---|---|---|
| CN | 106792739 A | 5/2017 |
| WO | 2017063708 A1 | 4/2017 |

OTHER PUBLICATIONS

Huawei, "Solution section reorganization," Agenda Item: 6.6.5, 3GPP TSG SA WG5 (Telecom Management) Meeting #113 S5-173137, May 8, 2017, West Palm Beach, Florida (US).
(Continued)

*Primary Examiner* — Donald L Mills
(74) *Attorney, Agent, or Firm* — RIMON PC

(57) ABSTRACT

Embodiments of the present disclosure include a method, a device, and a system for deploying a network slice. The method, device, and system disclosed herein are related to the field of communications technologies and are designed to solve the problem of low efficiency in manually deploying a network slice. In an exemplary solution, a first network management unit receives a network slice management request message that carries service traffic information of a network slice, and, based on the service traffic information of the network slice, deploys the network slice or selects an available network slice in an existing network.

20 Claims, 8 Drawing Sheets

Related U.S. Application Data continuation of application No. PCT/CN2018/095677, filed on Jul. 13, 2018.

(51) Int. Cl.
  *H04L 41/0893* (2022.01)
  *H04W 28/02* (2009.01)
  *H04W 84/04* (2009.01)

(56) References Cited

U.S. PATENT DOCUMENTS

| | | | |
|---|---|---|---|
| 2017/0141973 A1 | 5/2017 | Vrzic | |
| 2018/0332442 A1* | 11/2018 | Shaw | H04L 41/0893 |
| 2018/0352501 A1* | 12/2018 | Zhang | H04W 48/18 |
| 2019/0386878 A1* | 12/2019 | Chou | H04L 41/0893 |
| 2020/0112861 A1* | 4/2020 | Yao | H04L 41/0894 |
| 2020/0177687 A1* | 6/2020 | Kodaypak | H04L 41/0806 |

OTHER PUBLICATIONS

Intel, "pCR TR 28.800 add architecture option to support network slice management," Agenda Item: 6.5.4, 3GPP TSG SA WG5 (Telecom Management) Meeting #112 S5-171555, Mar. 27, 2017, Guilin, P. R. China.

3rd Generation Partnership Project: 3GPP TR 28.801 V1.2.0, "3rd Generation Partnership Project;Technical Specification Group Services and System Aspects; Telecommunication management; Study on management and orchestration of network slicing for next generation network (Release 15)", May 1, 2017, total 80 pages.

Huawei, 3GPP TSG SA WG5 (Telecom Management) Meeting #113,35-173567,: pCR TR 28.801 generic customer service provision solution, May 8, 2017, Agenda item: 6.6.5, West Palm Beach, Florida (US) total 4 pages.

Huawei,"Add potential solution for creating a network slice instance to support a communication service",3GPP TSG SA WG5 (Telecom Management) Meeting #1 11 Bis S5A-170115, Feb. 13, 2017, Munich (Germany), total 2 pages.

* cited by examiner

METHOD, DEVICE, AND SYSTEM FOR DEPLOYING NETWORK SLICE

CROSS-REFERENCE TO RELATED APPLICATIONS

This application is a continuation of U.S. patent application Ser. No. 16/750,633, filed on Jan. 23, 2020, which is a continuation of International Application No. PCT/CN2018/095677, filed on Jul. 13, 2018, which claims priority to Chinese Patent Application No. 201710642648.2, filed on Jul. 31, 2017. All of the afore-mentioned patent applications are hereby incorporated by reference in their entireties.

TECHNICAL FIELD

Embodiments of the present disclosure relate to the field of communications technologies, and in particular, to a method, a device, and a system for deploying a network slice.

BACKGROUND

The 5th-generation (5G) mobile communications system (may be referred to as a next-generation mobile communications system) adopts the most advanced mobile communications technology, and can provide bandwidth resources with a great capacity and safer communication for mobile subscribers. To meet widely changed service requirements from all areas of the industry, the 5G system adopts a network slice technology to divide one physical network into a plurality of virtual end-to-end networks. Each virtual network may be referred to as a network slice (NS). Each network slice is logically independent. Each network slice is formed by instantiating an independent network function or a combination of functions. Each network slice is formed to meet different service requirements and different services has different function features. In the 5G system, the separation of the network slices prevents different tenants from affecting each other. Network slices can accommodate different application scenarios, offer flexible and dynamic definitions of requirement information, and provide customized network capability for each of the tenants.

Currently, the following manner is usually used to deploy a network slice for each tenant: After receiving an order contract provided by the tenant, an O&M engineer, based on requirement information in the contract may analyze and plan with an equipment vendor to obtain network deployment information, and deploy the network slice based on the network deployment information. Because such deployment manner needs manual analysis and is not efficiency, rapidly deployment of tenant services cannot be achieved.

SUMMARY

Embodiments of the present disclosure provide a method, a device, and a system for deploying a network slice, to resolve an existing problem of low efficiency in manually deploying the network slice.

To achieve the foregoing objective, the embodiments of the present disclosure use the following technical solutions.

According to an aspect, an embodiment of the present disclosure provides a method for deploying a network slice. The method includes:

receiving, by a first network management (NM) unit, a network slice management request message that carries service traffic information of the network slice; and deploying, by the first network management unit based on the service traffic information of the network slice, the network slice or selecting an available network slice in an existing network.

The service traffic information of the network slice may be obtained based on traffic information of a service requested by a tenant, and the service traffic information of the network slice is used by the first NM to manage the network slice (for example, deploying a new network slice or selecting the available network slice in the existing network).

Compared with the prior art, in the solution provided by this embodiment of the present disclosure, the NM receives the service traffic information of the network slice, and deploys, based on the service traffic information of the network slice, the network slice or selects the available network slice in the existing network. A device performs auto-management on the network slice in real time based on the service traffic information. This avoids a manual process of off-line network planning, improves efficiency in deploying the network slice, and reduces on-boarding time of a service.

With reference to the aspect, in a possible implementation, the service traffic information of the network slice may include at least one piece of the following information: a quantity of terminal devices, a geographic distribution of the terminal devices, a service transmission status of the terminal devices, an activation ratio of the terminal devices, a usage time of a service, a coverage of the service, a moving status of the terminal devices, and a roaming status of the terminal devices.

The quantity of terminal devices may mean: a quantity of devices that can obtain or use a service of the tenant.

The geographic distribution of the terminal devices may mean: an area deployment status of the devices that can obtain or use a service of the tenant.

The service transmission status of the terminal devices may mean: a service usage status of the terminal devices, such as a time period of transmitting and receiving services by the terminal devices, a packet size of the services transmitted and received by the terminal devices, a power of the services transmitted and received by the terminal devices, and a bandwidth size of the services transmitted and received by the terminal devices.

The activation ratio of the terminal devices may mean: a ratio of the quantity of terminal devices in an activated state to the quantity of all terminal devices, or may mean a ratio of the quantity of terminal devices in an activated state to the quantity of all terminal devices at a moment.

The usage time of the service may mean: the time in which a tenant uses the terminal devices to use the service. For example, a reading meter service is performed on the last day of every month.

The coverage of the service may be used to indicate a coverage status of the service, and may mean a service coverage level or a coverage scenario. The service coverage scenario includes, for example, an in-building coverage, an outdoor coverage, a suburban area coverage, a metro coverage, a tunnel coverage, and the like. The service coverage level may be a heavy coverage, a common coverage, and a weak coverage.

The moving status of the terminal devices may include at least one of the following cases: whether the terminal devices move, a quantity of the terminal devices that are in a moving status, and a moving level of the terminal devices.

The moving level of the terminal devices may include one or more of the following levels: fast speed, middle speed, low speed, or non-moving.

The roaming status of the terminal devices may include at least one of the following cases: whether the terminal devices roam, a quantity of the terminal devices that may roam at different moments, and the like.

With reference to the foregoing aspect or the foregoing possible implementations, in another possible implementation, the deploying, by the first NM based on the received service traffic information of the network slice, the network slice or selecting an available network slice in an existing network may include:

when the service of the network slice is borne on one network slice subnet, the network slice subnet being equivalent to the network slice, the service traffic information of the network slice being equivalent to the service traffic information of the network slice subnet, and deploying, based on the service traffic information of the network slice subnet, the network slice subnet or selecting the available network slice subnet in the existing network; or, when the service of the network slice is borne on at least two network slice subnets, decomposing the service traffic information of the network slice into service traffic information of the at least two network slice subnets respectively corresponding to the at least two network slice subnets, deploying, based on the service traffic information of the at least two network slice subnets, the at least two network slice subnets, or selecting available network slice subnets in the existing network; or, when the service of the network slice is borne on at least two network slice subnets, decomposing the service traffic information of the network slice into service traffic information of the at least two network slice subnets respectively corresponding to the at least two network slice subnets, and sending the service traffic information of the network slice subnets to a domain management (DM) unit, so that the DM deploys, based on the service traffic information of the network slice subnets, the network slice subnets, or selects available network slice subnets in the existing network; or, when the service of the network slice is borne on one network slice subnet, the network slice subnet being equivalent to the network slice, the service traffic information of the network slice being equivalent to service traffic information of the network slice subnet, and sending the service traffic information of the network slice to a DM, so that the DM deploys, based on the service traffic information of the network slice, the network slice or selects the available network slice in the existing network.

In this case, the deploying the network slice or selecting the available network slice in the existing network may be implemented based on the foregoing manner, which improves the flexibility of network slice deployment.

With reference to the foregoing aspect or any one of the foregoing possible implementations, in another possible implementation, the first NM may receive the service traffic information of the network slice from a service management function (SMF); or, receive the service traffic information of the network slice from a tenant; or, receive the service traffic information of the network slice from a second NM.

With reference to the foregoing aspect or any one of the foregoing possible implementations, in another possible implementation, in order to resolve a problem of cross-domain network slice deployment, the method may further include:

sending, by the first NM, the service traffic information of the network slice to a third NM.

The third NM is an NM that is not located in a same domain with the NM.

With reference to the foregoing aspect or any one of the foregoing possible implementations, in another possible implementation, the method may further include:

determining, by the first NM based on the service traffic information of the network slice, whether the first NM is able to provide the network slice to satisfy a requirement of the service traffic information of the network slice, and if the first NM is unable to do so, not deploying, based on the service traffic information of the network slice, the network slice or selecting the available network slice in the existing network, and sending a response message to a sender of the network slice management request message; or otherwise, deploying, by the NM based on the service traffic information of the network slice, the network slice or selecting the available network slice in the existing network.

According to an aspect, an embodiment of the present disclosure provides an NM that includes:

a receiving unit, configured to receive a network slice management request message that carries service traffic information of a network slice; and a deployment unit, configured to: based on the service traffic information that is received by the receiving unit and that is of the network slice, deploy the network slice or select an available network slice in an existing network.

For a specific implementation of the NM, refer to the behavior function of the first NM in the method for deploying a network slice according to the foregoing aspect or possible implementations of the foregoing aspect. Details are not described herein again. Therefore, the NM provided by this aspect may have the same advantageous effect as that of the foregoing aspect.

According to an aspect, this embodiment of the present disclosure provides an NM. The NM can implement functions performed by the first NM in the foregoing method embodiments. The functions may be implemented by using hardware, or may be implemented by using the hardware to execute corresponding software. The hardware or the software includes one or more modules corresponding to the foregoing functions.

In a possible design, a structure of the NM includes a processor and a communications interface. The processor is configured to support the NM in performing the corresponding functions in the foregoing method. The communications interface is configured to support communication between the NM and another network element. The NM may further include a memory. The memory is configured to couple to the processor, and the memory stores a necessary program instruction and data that are both of the NM.

According to an aspect, an embodiment of the present disclosure provides a computer storage medium, configured to store a computer software instruction used by the foregoing NM, where the computer software instruction includes a program used for executing the solution in the foregoing aspects.

According to an aspect, an embodiment of the present disclosure provides a computer program product, where a computer software instruction used by the foregoing first NM is stored in the program product, and the computer software instruction includes a program used for executing the solution in the foregoing aspects.

According to an aspect, an embodiment of the present disclosure provides an apparatus. The apparatus exists as a product form of a chip. A structure of the apparatus includes a processor and a memory, where the memory is configured to couple to the processor and store a program instruction and data that are both of the apparatus, and the processor is configured to execute the program instruction stored in the memory and enables the apparatus to perform the functions corresponding to the NM in the foregoing method.

According to another aspect, an embodiment of the present disclosure provides a method for deploying a network slice. The method may include:

receiving, by a DM, service traffic information of a network slice subnet from a network management unit NM, and managing the network slice subnet based on the service traffic information of the network slice subnet.

Compared with the prior art, in the solution provided by the embodiments of the present disclosure, the DM receives the service traffic information of the network slice subnet, and manages the network slice subnet based on the service traffic information of the network slice subnet. A device performs auto-management on the network slice in real time based on the service traffic information, which avoids a process of manual off-line network planning, improves efficiency in deploying the network slice, and reduces on-boarding time of a service.

With reference to still another aspect, in a possible implementation, the managing, by a DM, the network slice subnet may include at least one of the following manners:

selecting, by the DM, an available network slice subnet in an existing network;

deploying, by the DM, a new network slice subnet; and decomposing, by the DM, the service traffic information of the network slice subnet into service traffic information of a network function unit, and sending service traffic information of an NF to the NF or a management unit of the NF.

With reference to the still another aspect or the possible implementation of the still another aspect, in another implementation, information included in the service traffic information of the network slice subnet is the same as the information included in the foregoing service traffic information of the network slice, and details are not described herein again.

According to still another aspect, an embodiment of the present disclosure provides a DM that includes:

a receiving unit, configured to receive service traffic information of a network slice subnet from a network management unit NM; and a management unit, configured to manage the network slice subnet based on the service traffic information of the network slice subnet.

For a specific implementation of the DM, refer to the behavior function of the DM in the method for deploying a network slice according to the foregoing aspects or the possible implementations of the foregoing aspects. Details are not described herein again. Therefore, the DM provided by this aspect may have the same advantageous effect as that of the foregoing aspects.

According to still another aspect, this embodiment of the present disclosure provides a DM. The DM can implement functions performed by the DM in the foregoing method embodiments. The functions may be implemented by using hardware, or may be implemented by using the hardware to execute corresponding software. The hardware or the software includes one or more modules corresponding to the foregoing functions.

In a possible design, a structure of the DM includes a processor and a communications interface. The processor is configured to support the DM in performing the corresponding functions in the foregoing method. The communications interface is configured to support communication between the DM and another network element. The DM may further include a memory. The memory is configured to couple to the processor. The memory stores a necessary program instruction and data that are both of the DM.

According to still another aspect, an embodiment of the present disclosure provides a computer storage medium, configured to store a computer software instruction used by the foregoing DM, where the computer software instruction includes a program used for executing the solution in the foregoing aspects.

According to still another aspect, an embodiment of the present disclosure provides a computer program product, where a computer software instruction used by the foregoing DM is stored in the program product, and the computer software instruction includes a program used for executing the solution in the foregoing aspects.

According to still another aspect, an embodiment of the present disclosure provides an apparatus, the apparatus exists as a product form of a chip, and a structure of the apparatus includes a processor and a memory, where the memory is configured to couple to the processor and store a necessary program instruction and data that are both of the apparatus, and the processor is configured to execute the program instruction stored in the memory and enables the apparatus to perform the functions corresponding to the DM in the foregoing method.

According to yet another aspect, an embodiment of the present disclosure provides a method for deploying a network slice. The method may include:

receiving, by an SMF, a service management request message that carries traffic information of a service, and determining, based on the traffic information of the service, service traffic information or sub-service traffic information of the network slice.

Compared with the prior art, in the solution provided by this embodiment of the present disclosure, the SMF receives the traffic information of the service, and determines the service traffic information of the network slice based on the traffic information of the service. A device performs auto-management on the network slice in real time based on the service traffic information, which avoids a manual process of off-line network planning, improves efficiency in deploying the network slice, and reduces on-boarding time of a service.

With reference to yet another aspect, in a possible implementation, after the determining, by an SMF based on the traffic information of the service, service traffic information or sub-service traffic information of the network slice, the method may further include:

sending, by the SMF to an NM, the service traffic information of the network slice that is used by the NM to deploy the network slice or select an available network slice in an existing network, so that the NM deploys the network slice based on the service traffic information of the network slice; or, selecting, by the SMF, an available network slice in an existing network based on the service traffic information of the network slice; or, sending, by the SMF, a sub-service management request message to other service management units, where the sub-service management request message carries the sub-service traffic information.

In this case, the network slice may be deployed by the SMF, or the network slice may be deployed by the NM, improving the flexibility of network slice deployment.

With reference to the yet another aspect or the foregoing possible implementation, in a possible implementation, the determining, by an SMF based on the traffic information of the service, the service traffic information of the network slice may include:

decomposing, by the SMF, the traffic information of the service into at least one piece of sub-service traffic information, and determining the decomposed sub-service traffic information as the service traffic information of the network slice.

With reference to the yet another aspect or the foregoing possible implementations, in another possible implementation, information included in the traffic information of the service and in the service traffic information of the network slice is the same as the content included in the foregoing service traffic information of the network slice, and details are not described herein again.

According to yet another aspect, an embodiment of the present disclosure provides an SMF, including:

a receiving unit, configured to receive a service management request message that carries traffic information of a service; and a determining unit, configured to determine service traffic information of a network slice based on the traffic information of the service.

For a specific implementation of the SMF, refer to the behavior function of the SMF in the method for deploying a network slice according to the foregoing aspects or the possible implementations of the foregoing aspects. Details are not described herein again. Therefore, the SMF provided by this aspect may have the same advantageous effect as that of the foregoing aspects.

According to yet another aspect, this embodiment of the present disclosure provides an SMF, the SMF can implement functions performed by the SMF in the foregoing method embodiments, and the functions may be implemented by using hardware, or may be implemented by using the hardware to execute corresponding software. The hardware or the software includes one or more modules corresponding to the foregoing functions.

In a possible design, a structure of the SMF includes a processor and a communications interface. The processor is configured to support the SMF in performing the corresponding functions in the foregoing method. The communications interface is configured to support communication between the SMF and another network element. The SMF may further include a memory. The memory is configured to couple to the processor, and the memory stores a necessary program instruction and data that are both of the SMF.

According to yet another aspect, an embodiment of the present disclosure provides a computer storage medium, configured to store a computer software instruction used by the foregoing SMF, where the computer software instruction includes a program used for executing the solution in the foregoing aspects.

According to yet another aspect, an embodiment of the present disclosure provides a computer program product, where a computer software instruction used by the foregoing SMF is stored in the program product, and the computer software instruction includes a program used for executing the solution in the foregoing aspects.

According to yet another aspect, an embodiment of the present disclosure provides an apparatus. The apparatus exists as a product form of a chip. The apparatus includes a processor and a memory, where the memory is configured to couple to the processor and store a program instruction and data that are both of the apparatus. The processor is configured to execute the program instruction stored in the memory and enables the apparatus to perform the functions corresponding to the SMF in the foregoing method.

According to yet another aspect, an embodiment of the present disclosure provides a system for deploying a network slice, including: the NM according to the foregoing aspects or any one of possible implementations of the foregoing aspects, the DM according to the foregoing aspects or any one of possible implementations of the foregoing aspects, and the SMF according to the foregoing aspects or any one of possible implementations of the foregoing aspects.

DESCRIPTION OF EMBODIMENTS

Embodiments of the present disclosure provide a method for deploying a network slice, and an example method includes: automatically deploying, by a management unit based on service traffic information of the network slice, the network slice or selecting an available network slice in an existing network, to improve efficiency in network slice deployment, and satisfy a requirement of rapidly deploying a tenant service could not be satisfied before.

Implementations of the embodiments of the present disclosure are described in detail below with reference to the accompanying drawings. Before technical solutions are described, to better understand the technical solutions in the embodiments of the present disclosure, some terms used to describe in the embodiments of the present disclosure are described firstly.

Network slice: may alternatively be referred to as a network slice instance. It is a combination of network function (NF) units and resources and it ensures that a bearer service meet a service level agreement (SLA) requirement. These NFs and resources may perform, based on different requirements, a hard separation (for example, a physical separation), or a soft separation (for example, a logical separation). Each network slice is logically independent. A network slice may include a core network (CN) part, an access network (AN) part, and a transport network (TN) part; or may include any two parts or one part of a CN part, an AN part, or a TN part.

In the embodiments of the present disclosure, the network slice is a broad concept. A conventional network or one dedicated network may also be considered one network slice. Alternatively, a network slice subnet may also be considered one type of network slices.

Network slice subnet: may be referred to as a network slice subnet instance. It is a combination of network functions and resources and it ensures that a bearer service meet the SLA requirement. Usually, a network slice subnet may be obtained by dividing the network slice. Alternatively, a network slice may be regarded as a network slice subnet.

Tenant: is a user (such as an enterprise, a factory, a school, and the like) that uses a network slice or a network slice subnet to complete a service function.

Figure 1:
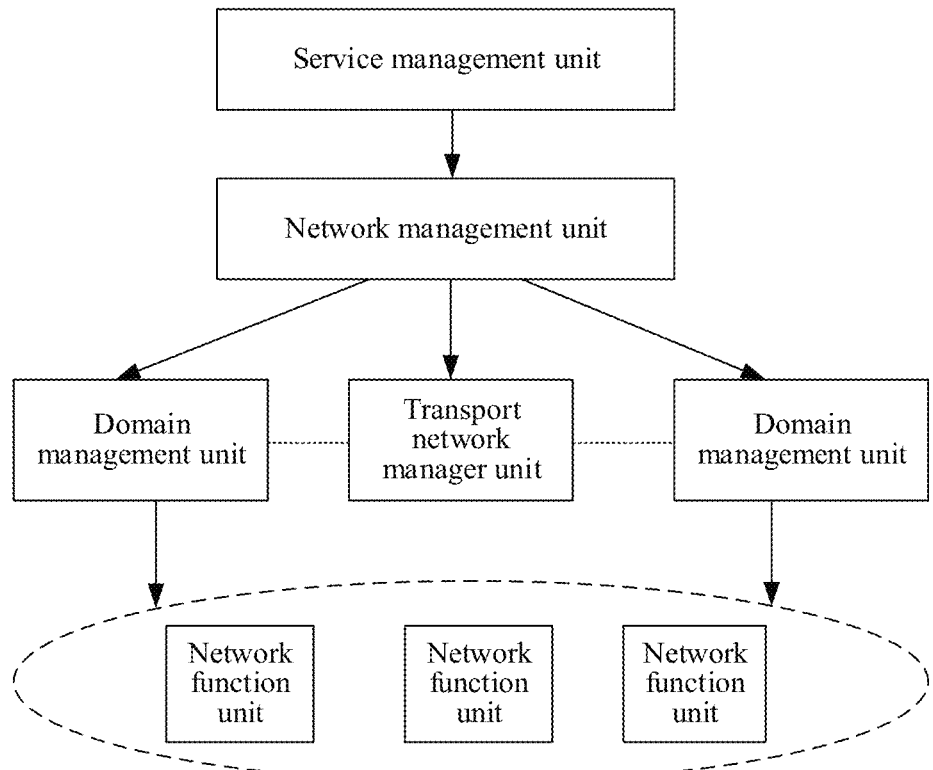
FIG. 1 is a simplified schematic diagram of a system architecture according to an embodiment of the present disclosure.

The method for deploying a network slice according to the embodiments of the present disclosure may be implemented by using function units in a network architecture shown in FIG. 1, and the network architecture may be deployed in a 5G system. As shown in FIG. 1, the network architecture may include: a service management unit (SMF), a network management (NM) unit, a domain management (DM) unit, a transport network domain management (TN-DM) unit, and a network function (NF) unit. Data or a signaling message may be transmitted between the DMs by using the TN-DM. A plurality of NFs may form the network slice or the network slice subnet. It should be noted that FIG. 1 is merely an exemplary architectural diagram. In addition to the function nodes shown in FIG. 1, the network architecture may further include other function nodes, which is not limited hereto in one particular embodiment of the present disclosure.

The SMF shown in FIG. 1 is configured to receive a service requirement of a tenant, convert the service requirement into a requirement of the network slice, and perform service management. The SMF may be deployed inside an operation support system (OSS) or outside the OSS. The SMF may be a management unit or an operation unit of the tenant. The SMF may be deployed independently, or may be integrated in a management unit (for example, a business support system (BSS), the service management unit, a service orchestration unit, or a service management and orchestration unit). It should be noted that the SMF is not limited to named units shown in FIG. 1. Further examples of an SMF may include a customer service management function (CSMF) unit or a communication service management function (CSMF) unit.

The NM in FIG. 1 includes one or both of an end-to-end network management function or an end-to-end network orchestration function, and may have some or all of the following functions: management of an end-to-end network (for example, life cycle management of a network, management of a network template, fault management of a network, performance management of a network, and configuration management of a network), mapping between an end-to-end network and a sub-network and mapping between an end-to-end network and a network function, coordination of sub-SLAs or network resources that both are provided by different domains (such as an access network domain, a core network domain, and a transport domain), decomposing network requirement information into subnet requirement information, and unified orchestration of network functions and sub-networks that both are provided by all sub-domains, so that subnets or network functions that are both provided by different sub-domains may satisfy a requirement of a target service or of a network (for example, a requirement of an SLA, a requirement of a key performance indicator (KPI), and a requirement of a quality of service (QoS)). The NM may be deployed inside the OSS, or may be deployed outside the OSS. The NM may be independently deployed, or may be integrated in a management unit (for example, a network orchestration unit, a network management and orchestration unit, the service management unit, the service orchestration unit, the service management and orchestration unit, or a network function virtualization orchestrator (NFVO)). It should be noted that the NM is not limited to the named parts or units shown in FIG. 1. The NM may further be known as a cross-domain management unit, a cross-domain network slice management unit, a network slice management function (NSMF) unit, or the like.

The DM in FIG. 1 includes one or both of a subnet management function and an orchestration function, and may include some or all of the following functions: management of a domain (including life cycle management (creating, updating, and deleting) of a subnet, fault management of a subnet, performance management of a subnet, configuration management of a subnet, or the like), management of a service (including life cycle management of a service, fault management of a service, performance management of a service, configuration management of a service, or the like), and coordination of network resources (such as an NF, a network element (NE)). All the functions are used for unified orchestration. The DM may be deployed inside the OSS, or may be deployed outside the OSS. The DM may be independently deployed, or may be integrated in a management unit (for example, the network management unit, the network orchestration unit, the network management and orchestration unit, a network element management unit, a network function management unit, the service management unit, the service orchestration unit, a domain management unit, the service management and orchestration unit, or the NFVO). It should be noted that the DM is not limited to the named parts or units shown in FIG. 1. The DM may also be known as: a domain slice management unit, a network slice subnet management unit, or the like.

Specifically, a subnet managed by the foregoing DM may include one or more of the following parts: an AN part, a CN part, and a TN part. When the subnet managed by the DM merely includes the AN part, the subnet management unit may be considered as an AN DM; when the subnet managed by the DM merely includes the CN part, the subnet management unit may be considered as a CN DM; or when the subnet managed by the DM includes the AN and CN part, the subnet management unit may be considered as a Mix DM.

The TN-DM in FIG. 1 includes one or both of a transport network management function or a transport network orchestration function, and may include some or all of the following functions: management of a transport network part (including life cycle management (creating, updating, and deleting) of a transport network part, fault management of a transport network part, performance management of a transport network part, configuration management of a transport network part, or the like). The TN-DM may be deployed inside the OSS, or may be deployed outside the OSS. The TN-DM may be independently deployed, or may be integrated in a management unit (for example, the network management unit, the network orchestration unit, the network management and orchestration unit, the domain management unit, the network element management unit, the service management unit, the service orchestration unit, the domain management unit, the service management and orchestration unit, or the NFVO). It should be noted that the TN-DM is not limited to the named parts or units shown in FIG. 1. The TN-DM may further be known as: a (transport network) subnet management unit, a network slice transport network manager unit, or the like.

Figure 2:
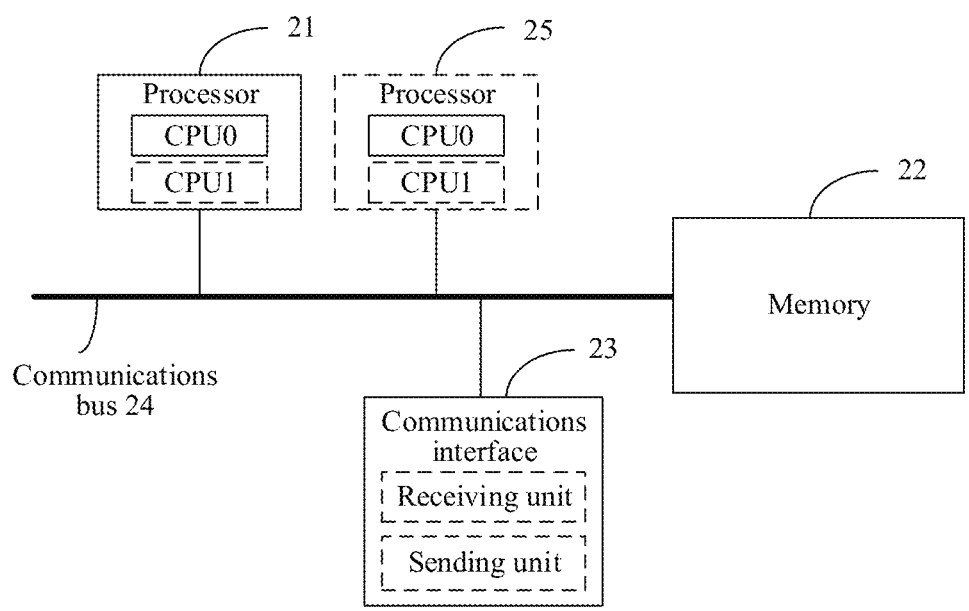
FIG. 2 is a schematic composition diagram of a management unit according to an embodiment of the present disclosure.

Specifically, the SMF, the NM, and the DM that are shown in FIG. 1 may be collectively referred to as management units that may include components shown in FIG. 2. FIG. 2 is a schematic composition diagram of a management unit according to an embodiment of the present disclosure. As shown in FIG. 2, the management unit may include at least one processor 21, a memory 22, a communications interface 23, and a communications bus 24. It should be noted that the device structure shown in FIG. 2 constitutes no limitation on the management unit, and may include more or fewer components than those shown in the figure. Some components may be combined, or different components may be deployed. Implementation details are not limited hereto in an embodiment of the present disclosure. The following specifically describes the components of the management unit with reference to FIG. 2.

The processor 21 is a control center of the management unit, may comprise one processor or a plurality of processing elements. For example, the processor 21 may be a central processing unit (CPU), or an application specific integrated circuit (ASIC), or one or more integrated circuits configured to implement this embodiment of the present disclosure, for example, one or more microprocessors (DSP) or one or more field programmable gate arrays (FPGA). The processor 21 may perform various functions of the management unit by running or executing a software program stored in the memory 22 and invoking data stored in the memory 22.

In a specific implementation, in an embodiment, the processor 21 may include one or more CPUs, for example, a CPU 0 and a CPU 1 shown in FIG. 2. In a specific implementation, in an embodiment, the management unit may include a plurality of processors, for example, the processor 21 and a processor 25 shown in FIG. 2. Each of the processors may be a single-core processor (single-CPU) or may be a multi-core processor (multi-CPU). The processor herein may refer to one or more devices, circuits, and/or processing cores configured to process data (such as a computer program instruction).

The memory 22 may be a read-only memory (ROM) or another type of static storage device that can store static information and a static instruction, or a random access memory (RAM) or another type of dynamic storage device that can store information and an instruction. The memory 22 may also be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium or another magnetic storage device, or any other medium that can be configured to carry or store expected program code in a form of an instruction or a data structure and that is accessible to a computer, but is not limited thereto. The memory 22 may exist independently, and be connected to the processor 21 through the communications bus 24. Alternatively, the memory 22 may be integrated with the processor 21. The memory 22 is configured to store a software program for executing the methods of this embodiment of the present disclosure, and the execution is controlled by the processor 21.

The communications interface 23 is configured to communicate with another device or a communications network such as an Ethernet, a radio access network (RAN), or wireless local area networks (WLAN), or the like. The communications interface 23 may include a receiving unit for implementing a receiving function and a sending unit for implementing a sending function.

The communications bus 24 may be an industry standard architecture (ISA) bus, a peripheral component interconnect (PCI) bus, an extended industry standard architecture (EISA) bus, or the like. The bus may include an address bus, a data bus, a control bus, and the like. For ease of representation, only a bold line is used for representation in FIG. 2, but this should not be interpreted to mean that there is only one bus or one type of buses.

When the management unit shown in FIG. 2 is the NM in FIG. 1, the management unit may perform functions performed by the NM in a method for deploying a network slice according to this embodiment of the present disclosure. For example, the communications bus 24 in the management unit may be configured to receive a network slice management request message that carries service traffic information of the network slice, and the processor 21 in the management unit may be configured to, based on the received service traffic information of the network slice, deploy the network slice or select the available network slice in the existing network.

When the management unit shown in FIG. 2 is the DM in FIG. 1, the management unit may perform functions performed by the DM in a method of deploying a network slice according to this embodiment of the present disclosure. For example, the communications bus 23 in the management unit may be configured to receive, from the NM, service traffic information of a network slice subnet, and the processor 21 in the management unit may be configured to manage the network slice subnet based on the received service traffic information of the network slice subnet.

When the management unit shown in FIG. 2 is the SMF in FIG. 1, the management unit may perform functions performed by the SMF in a method of deploying a network slice according to this embodiment of the present disclosure. For example, the communications bus 24 in the management unit may be configured to receive a service management request message that carries traffic information of a service, and the processor 21 in the management unit may be configured to determine service traffic information of the network slice based on the received traffic information of the service; and the communications interface 23 in the management unit may further be configured to send the service traffic information of the network slice to the NM.

The method for deploying a network slice according to this embodiment of the present disclosure is described in detail as follows with reference to the communications system shown in FIG. 1. Devices in the following method embodiments may correspond to the components shown in FIG. 2. It should be noted that although a logical order is shown in the following method flowchart, in some cases, shown or described steps may be performed in an order different from the order shown herein.

Figure 3:
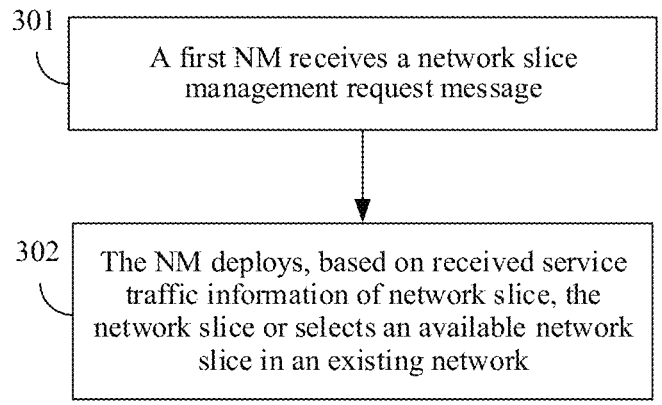
FIG. 3 is a flowchart of a method for deploying a network slice according to an embodiment of the present disclosure.

FIG. 3 is a flowchart of a method for deploying a network slice according to an embodiment of the present disclosure. As shown in FIG. 3, the method may include the following steps:

Step 301: An NM receives a network slice management request message.

The foregoing NM may be the NM in FIG. 1, the foregoing network slice management request message may be used to request the NM to manage the network slice, and the network slice management request message may carry service traffic information of the network slice.

The foregoing service traffic information of the network slice may be obtained based on traffic information of a service requested by a tenant. The service traffic information of the network slice is used by the NM to manage the network slice (for example, to deploy a new network slice and/or select an available network slice in the existing network). The service traffic information of the network slice may include at least one piece of the following information: a quantity of terminal devices, geographic distribution of the terminal devices, a service transmission status of the terminal devices, an activation ratio of the terminal devices, a usage time of the service, a coverage of the service, a moving status of the terminal devices, and a roaming status of the terminal devices.

It should be noted that in all embodiments of the present disclosure, A and/or B may include at least one of the following cases: A, B, and A and B. Similarly, deploying a new network slice and/or selecting the available network slice in the existing network may include three cases: deploying a new network slice, selecting the available network slice in the existing network, and deploying the new network slice and selecting the available network slice in the existing network. The existing network may mean: a network, including a network slice, a network slice subnet, and a network function unit, that is already deployed within a management range of the NM.

The foregoing tenant may be a user (such as a factory, a school, and the like) that uses a deployed network slice or a deployed network slice subnet in this embodiment of the present disclosure to complete a service function.

The foregoing terminal devices may mean devices that can obtain or use a service of the tenant, and the terminal devices correspond to the tenant. For example, a terminal device may be a device such as a meter that records a quantity of electricity used by the tenant, and the like.

The service requested by the tenant may be: a service function performed by the terminal devices corresponding to the tenant. For example, a terminal device is the meter that records the quantity of electricity used by the tenant, and the service requested by the tenant may be a reading of the meter service.

The quantity of terminal devices may mean: a quantity of devices that can obtain or use a service of the tenant.

The geographic distribution of the terminal devices may mean: an area deployment status of devices that can obtain or use a service of the tenant. The quantity of terminal devices and the geographic distribution status of the terminal devices may be combined as one type of information of the service traffic information of the network slice. For example, the quantity of terminal devices in area 1 is 100, and the quantity of terminal devices in area 2 is 200.

The service transmission status of the terminal devices may mean: a service usage status of the terminal devices, such as a time period of transmitting and receiving services by the terminal devices, a packet size of the services transmitted and received by the terminal devices, the power of the services transmitted and received by the terminal devices, and a bandwidth size of the services transmitted and received by the terminal devices. For example, a terminal device is a meter that records the amount of electricity used by the tenant, and the service transmission status of the terminal device is that the meter transmits a packet once every day, and the size of the transmitted packet is 20 M every time.

The activation ratio of the terminal devices may mean: a ratio of the quantity of terminal devices in an activated state to the quantity of all terminal devices, or may mean a ratio of the quantity of terminal devices in an activated state to the quantity of all terminal devices at a moment.

The usage time of the service may mean the time in which the terminal devices use the service. For example, the reading meter service is performed on the last day of every month.

The coverage of the service may be used to indicate a coverage status of the service, and may mean a service coverage level or a coverage scenario. The service coverage scenario includes, for example, an in-building coverage, an outdoor coverage, a suburban area coverage, a metro coverage, a tunnel coverage, and the like. The service coverage level may be a heavy coverage, a common coverage, and a weak coverage.

The moving status of the terminal devices may include at least one of the following cases: whether the terminal devices move, a quantity of the terminal devices that are in a moving status, and a moving level of the terminal devices. The moving level of the terminal devices may include one or more of the following levels: fast speed, middle speed, low speed, or non-moving.

The roaming status of the terminal devices may include at least one of the following cases: whether the terminal devices roam, the quantity of the terminal devices that may roam at different moments, and the like.

For example, the service traffic information of the network slice received by the NM is as follows: the quantity of terminal devices in Pudong of Shanghai is 2 million, the quantity of terminal devices in Puxi of Shanghai is 3 million, the terminal devices in each location area are evenly distributed, the service transmission status of the terminal device is that transmission is performed twice every month and is small packet transmission, the activation ratio of the terminal devices is 80%, the usage time of the service is the $15^{th}$ day and the $30^{th}$ day of every month, the moving status of the terminal devices is non-moving, and the roaming status of the terminal devices is non-roaming.

Optionally, the foregoing service traffic information of the network slice is not limited to including at least one piece of the foregoing information, and may further include multi-dimensional data formed by at least one piece of the foregoing information. For example, the service traffic information of the network slice may include at least one of the following multidimensional data: multidimensional data formed by a location area of terminal devices and an activation ratio of the terminal devices in the location area, multidimensional data formed by the location area of the terminal devices and a data transmission status of the terminal devices or a moving status of the terminal devices that are in the location area.

Optionally, the foregoing network slice management request message is not limited to including the service traffic information of the network slice, and may further include other types of information, such as deployment location information of the network slice, an affiliate of the network slice, and a non-affiliate of the network slice.

The deployment location information of the network slice may be used to indicate a deployment location of the network slice. An affinity of the network slice is defined as follows: when the network slice and another network slice can be deployed in a same location area, the network slice and the other network slice are an affiliate of one another the affinity. A non-affinity of the network slice is defined as, when the network slice and another network slice cannot be deployed in a same location area, the network slice and the other network slice are a non-affiliate of one another.

Step 302: Based on the received service traffic information of the network slice, the NM deploys the network slice or selects the available network slice in the existing network.

Deploying of the network slice may mean: deploying or selecting existing network resources (including at least one of the following information: a network function, a network slice subnet, and a transmission resource) in a network that are combined to act as a network slice to satisfy the service traffic information of the network slice. Selecting of the available network slice in the existing network may mean selecting a network slice that is already deployed within a management range of the NM to satisfy the service traffic information of the network slice. The network slice satisfies the service traffic information of the network slice may mean: the network slice can provide a service with the foregoing service traffic information.

It should be noted that in all embodiments of the present disclosure, the word "deploy" may further be replaced by "create" or "instantiate," that is, deploying the network slice may be alternatively referred to as creating the network slice or instantiating the network slice. This is not limited hereto.

Optionally, when there is a network slice in the existing network and the network slice satisfies the service traffic information of the network, or when there is a network slice in the existing network and the network slice may be modified (such as, capacity expansion) to satisfy the service traffic information of the network slice, or when the NM receives a message used to indicate that a network slice in the existing network needs to be reused, the NM selects the available network slice in the existing network, otherwise, the NM deploys the network slice.

Optionally, that the NM deploys, based on the received service traffic information of the network slice, the network slice or selects the available network slice in the existing network may include but be not limited to the following implementations.

Manner 1: when the network slice is formed by one network slice subnet, the network slice and the network slice subnet may be considered as the same network instance, and the service traffic information of the network slice is equivalent to the service traffic information of the network slice subnet. In this case, the NM deploys, based on the service traffic information of the network slice subnet, the network slice subnet or selects an available network slice subnet in the existing network.

Manner 2: when the network slice is formed by at least two network slice subnets, the NM decomposes the service traffic information of the network slice into the service traffic information of each of the two network slice subnets, and deploys, based on the service traffic information of the at least two network slice subnets, the at least two network slice subnets, or selects available network slice subnets in the existing network.

Manner 3: when the network slice is formed by at least two network slice subnets, the NM decomposes the service traffic information of the network slice into the service traffic information of each of the at least two network slice subnets, and sends the service traffic information of the network slice subnets to a DM, so that the DM deploys, based on the service traffic information of the network slice subnets, the network slice subnets, or selects available network slice subnets in the existing network.

Manner 4: when the network slice is formed by one network slice subnet, the network slice subnet is equivalent to the network slice, that is, the network slice and the network slice subnet may be considered as the same network instance, and the service traffic information of the network slice is equivalent to the service traffic information of the network slice subnet. In this case, the NM sends the service traffic information of the network slice to a DM, so that the DM deploys, based on the service traffic information of the network slice, the network slice, or selects the available network slice in the existing network.

In all embodiments of the present disclosure, the NM may determine that the network slice is formed by one or at least two network slice subnets in the following manner:

determining, by the NM based on the preset information, that the network slice is formed by one or more network slice subnets, where the preset information is used to describe the network slice being formed by one or more network slices, and the preset information may be stored, by the NM, in the NM in advance, or obtained by the NM from other nodes; or, receiving, by the NM, a message used to indicate that the network slice is formed by one or more network slice subnets, and determining, based on the message, that the network slice is formed by one or at least two network slice subnets; or, determining, by the NM based on a preset policy and the service traffic information of the network slice, that the network slice is formed by one or more network slice subnets, where the preset policy may be set according to a requirement, and this is not limited hereto.

In the manner 2 and the manner 3, the NM may adopt an existing algorithm to decompose the service traffic information of the network slice into the service traffic information of each of the at least two network slice subnets, and details are not described herein again.

Deploying the network slice subnet by the NM may include: deploying or selecting existing network resources (including at least one of the following: a network function, a network slice subnet, and a transmission resource) in a network that are combined to act as a network slice subnet to satisfy the service traffic information of the network slice subnet. The selecting of the available network slice subnet in the existing network may mean selecting a network slice subnet that is already deployed within a management range of the NM to satisfy the service traffic information of the network slice subnet.

In some embodiments of the present disclosure, the NM or DM deploying, based on the service traffic information of the network slice subnet, the network slice subnet or selecting the available network slice subnet in the existing network may include:

when there is a network slice subnet in the existing network and the network slice subnet satisfies the service traffic information of the network, or when there is a network slice subnet in the existing network and the network slice subnet may be modified (such as, capacity expansion) to satisfy the service traffic information of the network slice subnet, or when the NM receives a message used to indicate that a network slice subnet in the existing network needs to be reused, the NM selects an available network slice subnet in the existing network, or otherwise, the NM deploys the network slice subnet. That the network slice subnet satisfies the service traffic information of the network slice subnet may mean that the network slice subnet can provide a service with the foregoing service traffic information of the network slice subnet.

Figure 3A:
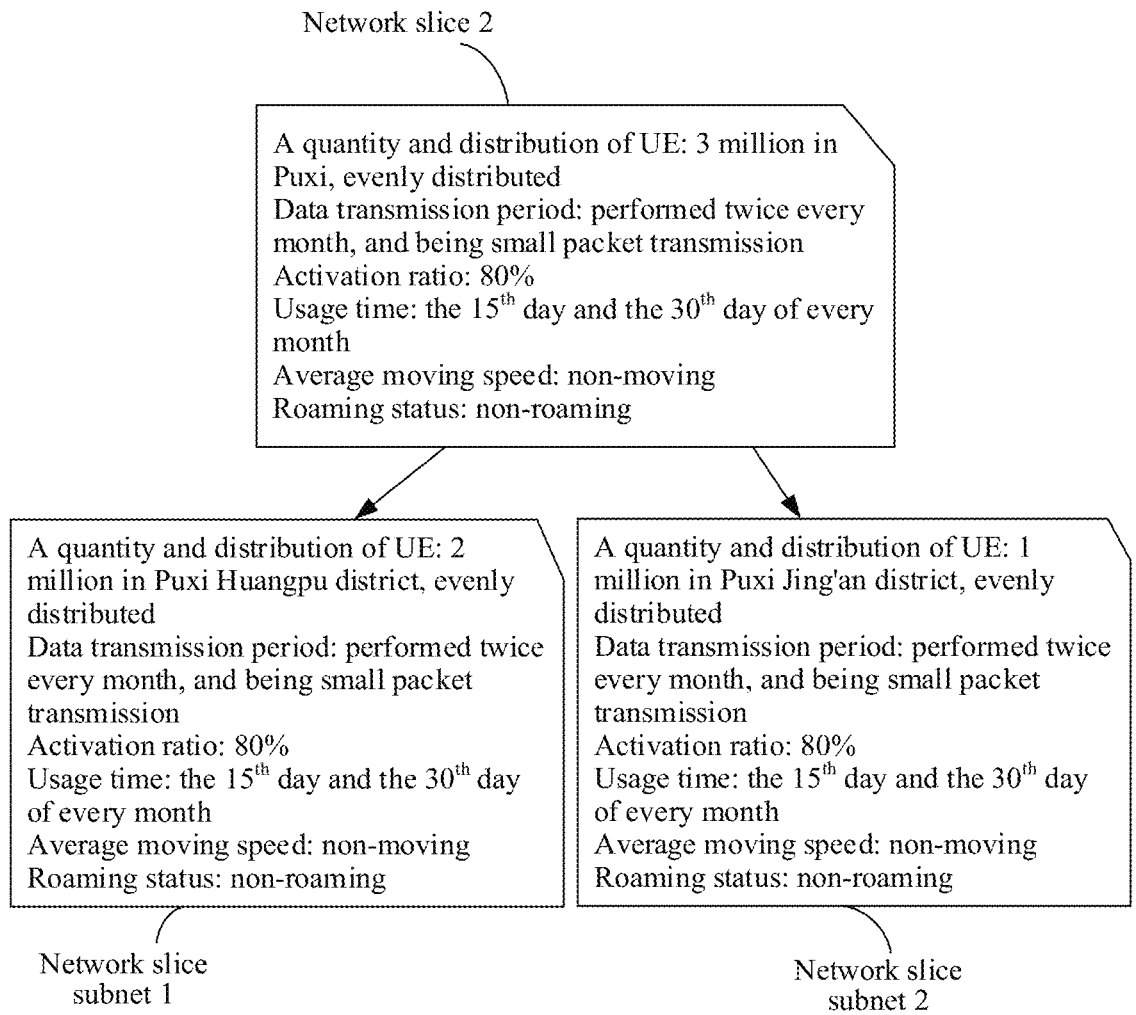
FIG. 3a is a schematic diagram of decomposing service traffic information of a network slice into service traffic information of network slice subnets according to an embodiment of the present disclosure.

For example, as shown in FIG. 3a, the service traffic information of a network slice 2 includes: the quantity of terminal devices in Puxi of Shanghai is 3 million, the terminal devices in each location area are evenly distributed, the service transmission status of the terminal device is that transmission is performed twice every month and is small packet transmission, the activation ratio of the terminal devices is 80%, the usage time of the service is the $15^{th}$ day and the $30^{th}$ day of every month, the moving status of the terminal devices is non-moving, and the roaming status of the terminal devices is non-roaming.

When determining that a service borne on a network slice 1 may be borne on two network slice subnets, the service traffic information of the network slice 1 is decomposed into the service traffic information of a network slice subnet 1 and the service traffic information of a network slice subnet 2. The service traffic information of the network slice subnet 1 includes: the quantity of terminal devices in Huangpu district, Pudong of Shanghai is 2 million, the terminal devices in each location area are evenly distributed, the service transmission status of the terminal device is that transmission is performed twice every month and is small packet transmission, the activation ratio of the terminal devices is 80%, the usage time of the service is the $15^{th}$ day and the 30th day of every month, the moving status of the terminal devices is non-moving, and the roaming status of the terminal devices is non-roaming. The service traffic information of the network slice subnet 2 includes a quantity of terminal devices in Jing'an district, Pudong of Shanghai is 1 million, the terminal devices in each location area are evenly distributed, the service transmission status of the terminal device is that transmission is performed twice every month and is small packet transmission, the activation ratio of the terminal devices is 80%, the usage time of the service is the $15^{th}$ day and the $30^{th}$ day of every month, the moving status of the terminal devices is non-moving, and the roaming status of the terminal devices is non-roaming.

Compared with the prior art, in the solution shown in FIG. 3, the NM receives the service traffic information of the network slice, and deploys, based on the service traffic information of the network slice, the network slice or selects the available network slice in the existing network. A device performs auto-management on the network slice in real time based on the service traffic information, which avoids manual off-line network planning, improves efficiency in deploying the network slice, and reduces on-boarding time of a service.

Optionally, in the solution shown in FIG. 3, the NM may receive the service traffic information of the network slice from a service management unit (SMF); or receive the service traffic information of the network slice from a tenant; or receive the service traffic information of the network slice from other NMs.

Optionally, in the solution shown in FIG. 3, to implement cross-domain network slice deployment, the method further includes:

sending, by the NM, the service traffic information of the network slice to other NMs.

The other NMs may be a network management unit of another operator other than the operator to which the NM belongs, or a network management unit of another region of the operator to which the NM belongs.

Optionally, the solution shown in FIG. 3 may further include:

determining, by the NM based on the service traffic information of the network slice, whether the NM is able to provide the network slice to satisfy a requirement of the service traffic information of the network slice; and if the NM is unable to do so, not performing step 302 and returning a response message to a sender of the network slice management request message, or otherwise, performing step 302.

Figure 4:
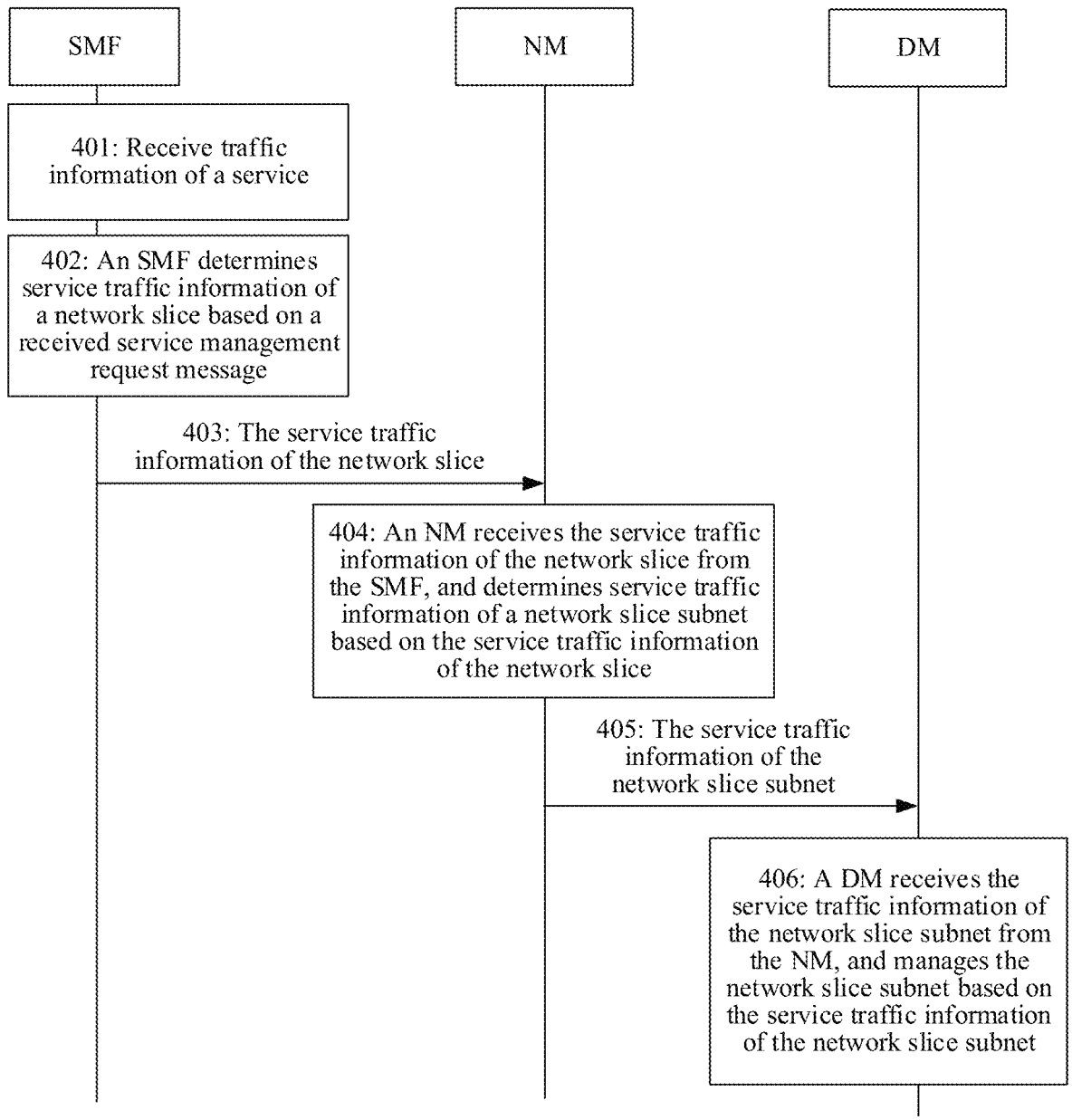
FIG. 4 is a flowchart of a method for deploying a network slice according to an embodiment of the present disclosure.
Figure 5:
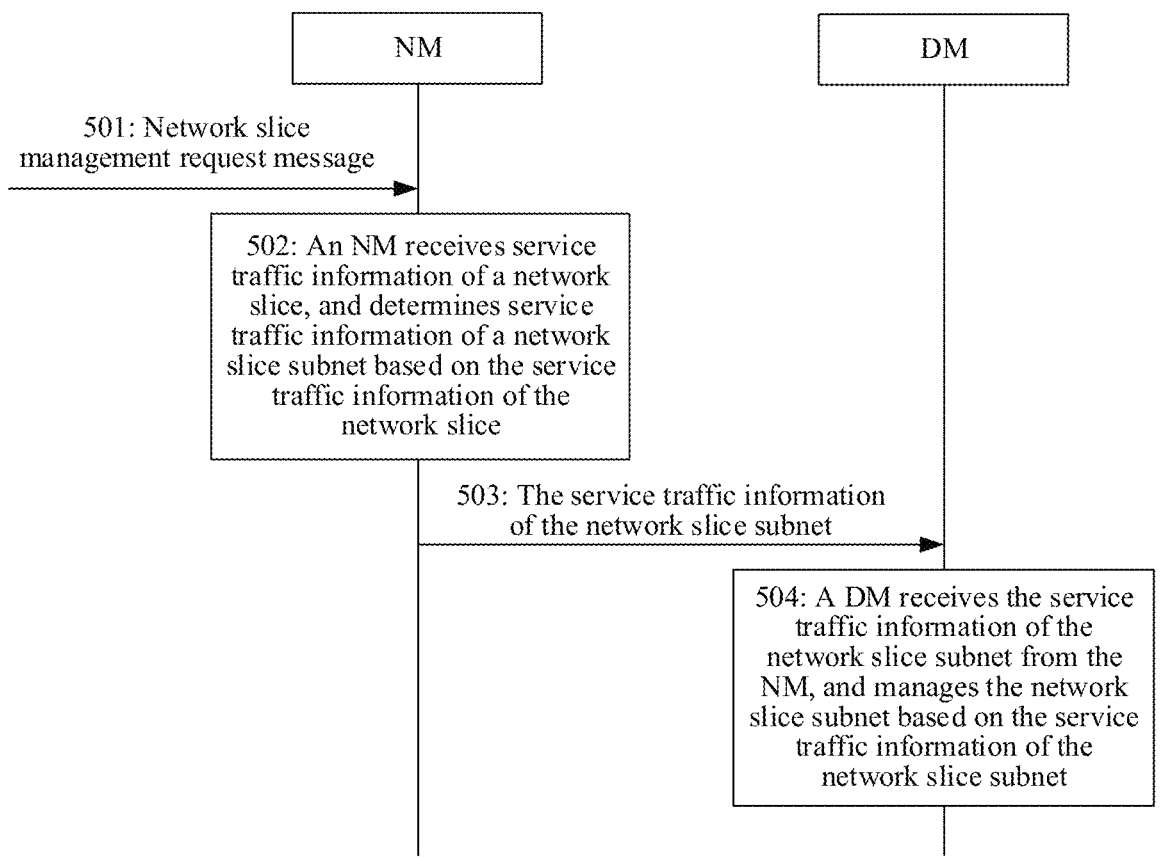
FIG. 5 is a flowchart of a method for deploying a network slice according to an embodiment of the present disclosure.
Figure 6:
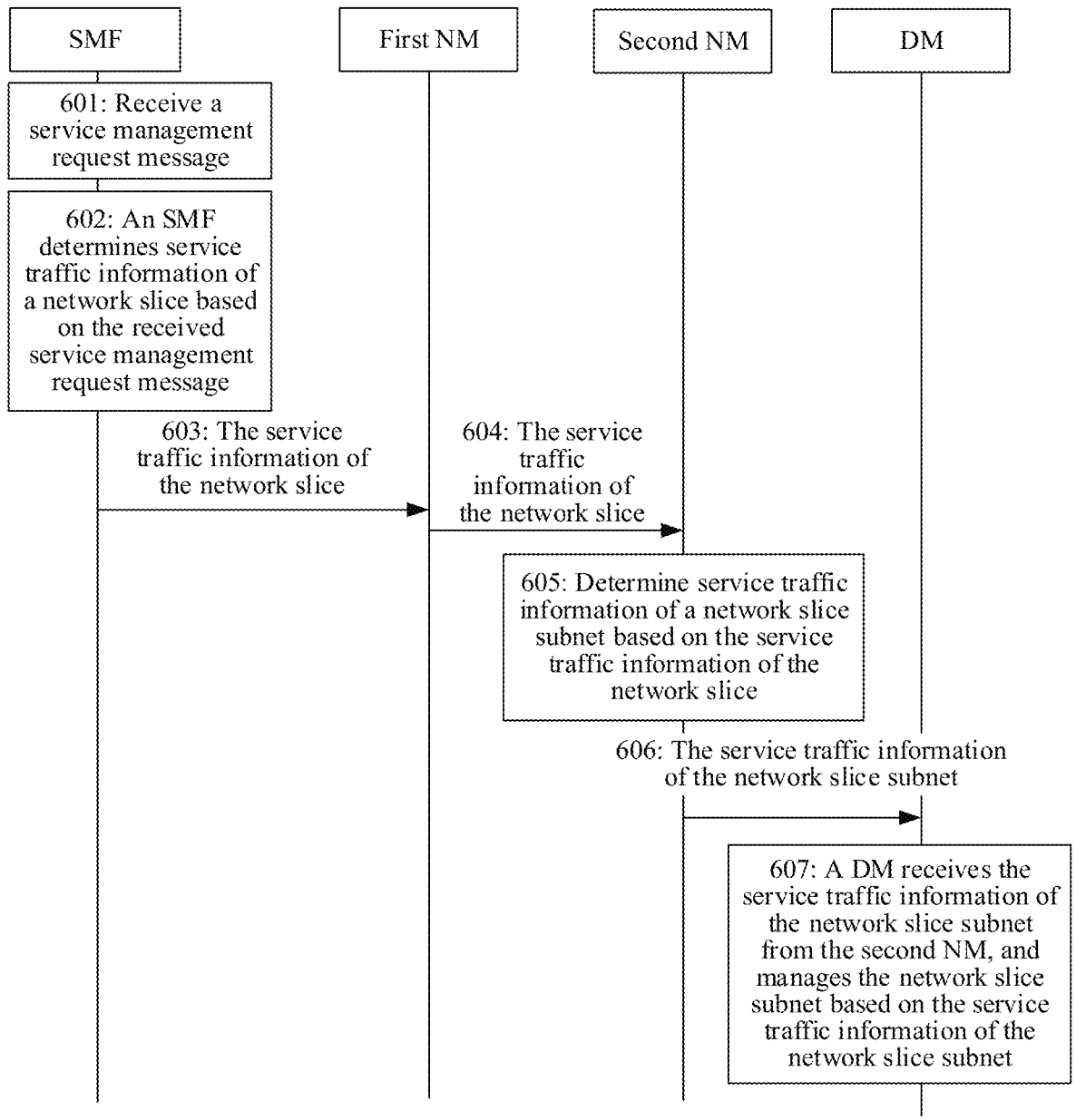
FIG. 6 is a flowchart of a method for deploying a network slice according to an embodiment of the present disclosure.

Specifically, for the foregoing optional steps, refer to related descriptions in FIG. 4, FIG. 5, and FIG. 6, and details are not described herein again.

FIG. 4 shows another method for deploying a network slice according to an embodiment of the present disclosure. The method may include the following steps:

Step 401: An SMF receives traffic information of a service.

The foregoing traffic information of a service is used to describe the service requirement information of a tenant, and the content included in the traffic information of the service may be the same as the content included in the service traffic information of the network slice in the solution shown in FIG. 3, and the details are not described herein again.

Optionally, the SMF receives a service management request message from the tenant, and the service management request message includes the traffic information of the service; or the SMF receives a sub-service management request message from another SMF, where the sub-service management request message includes the traffic information of the service, and the other SMF is a service management unit that is different from the SMF and that is in a network.

It should be noted that the traffic information of the service included in the sub-service management request message may be the traffic information that is received by the other SMF, or may be sub-service traffic information obtained after another SMF node decomposes the received traffic information of the service, and this is not limited hereto. For the content included in the sub-service traffic information, refer to related descriptions in the traffic information of the service, and details are not described herein again.

Step 402: The SMF determines service traffic information of a network slice based on the received service management request message.

The service traffic information of the network slice is the same as the description of FIG. 3, and the details are not described herein again.

For example, when a service requested by the tenant is borne on one network slice, the traffic information of the service carried in the service management request message is the service traffic information of the network slice, or when the service requested by the tenant is borne on at least two network slices, the traffic information of the service carried in the service management request message may be decomposed into at least two pieces of sub-service traffic information, and the decomposed pieces of sub-service traffic information may be determined as the service traffic information of the at least two network slices.

The SMF may determine that the service requested by the tenant is borne on one or at least two network slices in the following manner:

determining, by the SMF based on the preset information, that the service requested by the tenant is borne on one or at least two network slices, where the preset information is used to describe the network slice being formed by one or more network slices, and the preset information may be stored in the SMF in advance, or obtained by the SMF from other nodes; or, receiving, by the SMF, a message used to indicate that the service requested by the tenant is borne on one or at least two network slices, and determining, based on the message, that the network slice is formed by one or at least two network slice subnets, where the message may be carried in the service management request message; or, determining, by the SMF based on a preset policy and the service traffic information of the network slice, that the service requested by the tenant is borne on one or at least two network slices, where the preset policy may be set according to a requirement, and this is not limited hereto.

Figure 4A:
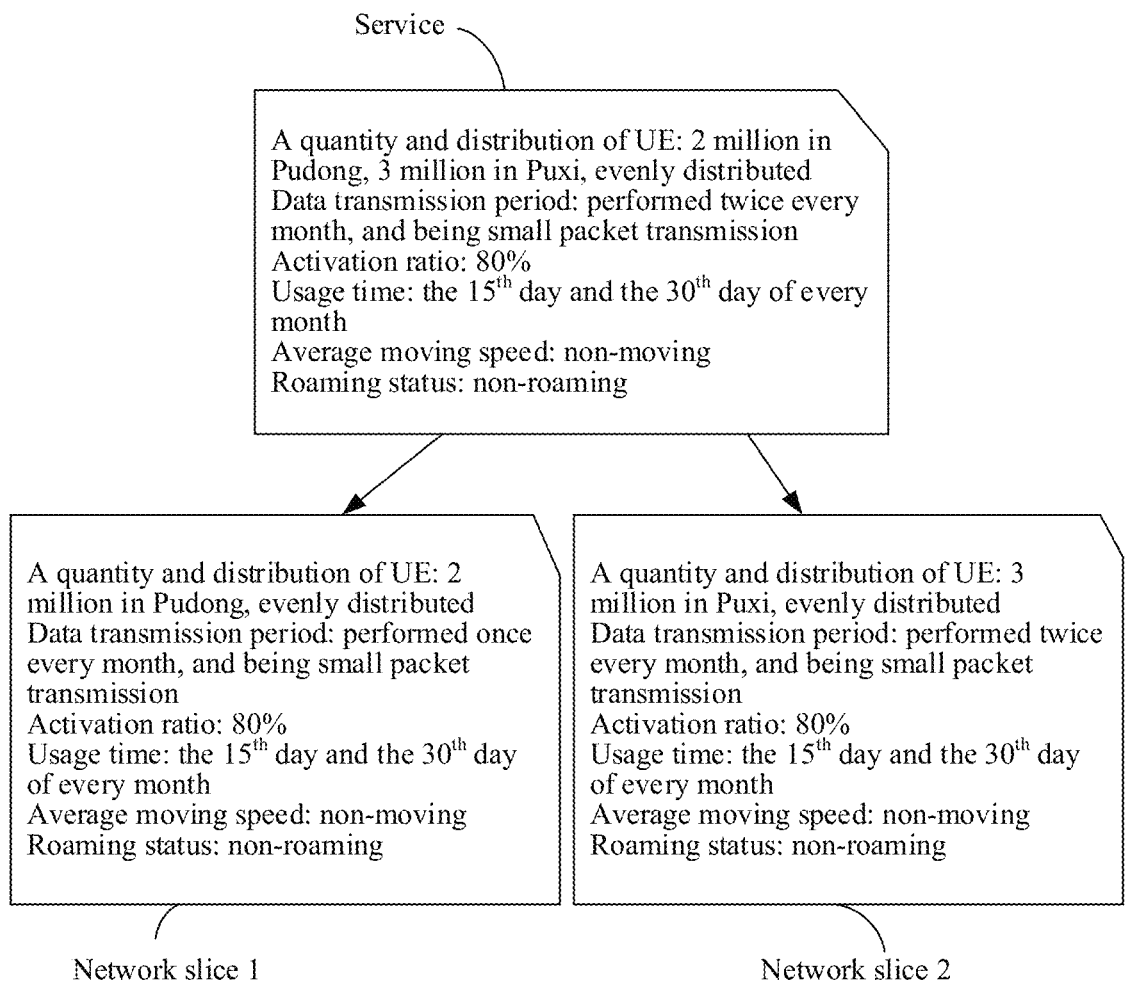
FIG. 4a is a schematic diagram of decomposing traffic information of a service into service traffic information of network slice subnets according to an embodiment of the present disclosure.

For example, as shown in FIG. 4a, the service requested by the tenant is a reading meter service in Shanghai area, and the traffic information of the service is that the quantity of terminal devices is 5 million, the terminal devices are evenly distributed; the service transmission status of the terminal device is that transmission is performed twice every month and is small packet transmission, the activation ratio of the terminal devices is 80%, the usage time of the service is the $15^{th}$ day and the $30^{th}$ day of every month; the moving status of the terminal devices is non-moving; and the roaming status of the terminal devices is non-roaming.

When determining that the service is implemented by network slices in Pudong area and Puxi area, the traffic information of the service is decomposed into the service traffic information of a network slice 1 and the service traffic information of a network slice 2. The service traffic information of the network slice 1 is that: the quantity of terminal devices in Pudong of Shanghai is 2 million, the terminal devices in each location area are evenly distributed, the service transmission status of the terminal device is that transmission is performed twice every month and is small packet transmission, the activation ratio of the terminal devices is 80%, usage time of the service is the $15^{th}$ day and the $30^{th}$ day of every month, the moving status of the terminal devices is: non-moving, and the roaming status of the terminal devices is: non-roaming. The service traffic information of the network slice 2 is that the quantity of terminal devices in Puxi of Shanghai is 3 million, the terminal devices in each location area are evenly distributed; the service transmission status of the terminal device is that transmission is performed twice every month and is small packet transmission, the activation ratio of the terminal devices is 80%, usage time of the service is the $15^{th}$ day and the $30^{th}$ day of every month; the moving status of the terminal devices is non-moving; and the roaming status of the terminal devices is non-roaming.

Step 403: The SMF sends the service traffic information of the network slice to an NM.

For example, the SMF may send the service traffic information of the network slice by using a next generation (NG) interface between the SMF and the NM.

It should be noted that when the service requested by the tenant is borne on at least two network slices, the SMF may respectively send the decomposed service traffic information of at least two network slices to at least two NMs, where the at least two NMs may be in one-to-one correspondence to the service traffic information of the at least two network slices.

Step 404: The NM receives the service traffic information of the network slice from the SMF, and determines the service traffic information of a network slice subnet based on the service traffic information of the network slice.

For a process of that the NM receives the service traffic information of the network slice, and determines service traffic information of the network slice subnet based on the service traffic information of the network slice, refer to the process in the solution in FIG. 3, and details are not described herein again.

Step 405: The NM sends the service traffic information of the network slice subnet to a DM.

For example, the NM may send the service traffic information of the network slice subnet by using an NG between the NM and the DM.

Step 406: The DM receives the service traffic information of the network slice subnet from the NM, and manages the network slice subnet based on the service traffic information of the network slice subnet.

For example, the DM may manage the network slice subnet in at least one of the following manners:

selecting, by the DM, an available network slice subnet in the existing network;

deploying, by the DM, a new network slice subnet; and decomposing, by the DM, the service traffic information of the network slice subnet into the service traffic information of an NF, and sending the service traffic information of the NF to the NF or a management unit of the NF.

For example, the DM may send a management request message to the NF or the management unit of the NF, and the management request message may include the service traffic information of the NF.

For the deploying process by the DM, a new network slice subnet, and the selecting, by the DM, the available network slice subnet in the existing network, refer to the process, shown in FIG. 3, of that the NM deploys the network slice subnet and the NM selects the available network slice subnet in the existing network, and details are not described herein again.

Content included in the service traffic information of the NF is the same as content included in the service traffic information of the network slice in the solution shown in FIG. 3, and details are not described herein again.

It should be noted that when in step 404, the NM determines that the service traffic information of the network slice is equivalent to the service traffic information of the network slice subnet, step 405 may be replaced by the step that the NM sends the service traffic information of the network slice to a DM, and step 406 may be replaced by the step that the DM receives the service traffic information of the network slice from the NM, and manages the network slice based on the service traffic information of the network slice. For the method used by the DM to manage the network slice, refer to the manner in which the DM manages the network slice subnet, and the manner includes at least one of the following manners:

selecting, by the DM, the available network slice in the existing network;

deploying, by the DM, the new network slice; and decomposing, by the DM, the service traffic information of the network slice into service traffic information of the NF, and sending the service traffic information of the NF to the NF or the management unit of the NF.

It should be noted that in the solution shown in FIG. 4, to reduce signaling exchange between function units, the SMF may further, based on the service traffic information of the network slice, deploy the network slice or select the available network slice in the existing network, and the SMF does not need to send the service traffic information of the network slice to another function unit. That is, the foregoing steps 403 to 406 may be replaced by: The SMF deploys, based on the service traffic information of the network slice, the network slice or selects the available network slice in the existing network. For a manner in which the SMF deploys, based on the service traffic information of the network slice, the network slice or selects the available network slice in the existing network, refer to the manner in which the NM deploys, based on the service traffic information of the network slice, the network slice or selects the available network slice in the existing network. Details are not described herein again.

Alternatively, the NM deploys, based on the service traffic information of the network slice, the network slice subnet or selects the available network slice in the existing network. That is, the foregoing steps 404 to 406 may be replaced by: The NM deploys, based on the service traffic information of the network slice, the network slice or selects the available network slice in the existing network. A manner in which the NM deploys, based on the service traffic information of the network slice, the network slice or selects the available network slice in the existing network is the same as descriptions in FIG. 3, and details are not described herein again.

Alternatively, the foregoing steps 404 to 406 may be replaced by: The NM receives the service traffic information of the network slice from the SMF, the NM sends the service traffic information of the network slice to the DM, and the DM deploys, based on the received service traffic information of the network slice, the network slice or selects the available network slice in the existing network. For a manner in which the DM deploys, based on the service traffic information of the network slice, the network slice or selects the available network slice in the existing network, refer to the manner, shown in FIG. 3, in which the NM deploys, based on the service traffic information of the network slice, the network slice or selects the available network slice in the existing network, and details are not described herein again.

Compared with the prior art, in the solution shown in FIG. 4, the SMF, the NM, and the DM are separately configured to deploy the network slice subnet or select the available network slice subnet in the existing network. A device performs auto-management on the network slice in real time based on the service traffic information. This replaces the manual process of off-line network planning, improves efficiency in deploying the network slice, and reduces on-boarding time of a service.

FIG. 5 shows still another method for deploying a network slice according to an embodiment of the present disclosure. The method may include the following steps.

Step 501: A tenant sends a network slice management request message to an NM.

For the network slice management request message, refer to the network slice management request message in the solution in FIG. 3, and details are not described herein again.

Step 502: The NM receives service traffic information of a network slice, and determines the service traffic information of a network slice subnet based on the service traffic information of the network slice.

Step 502 may be performed with reference to step 403, and details are not described herein again.

Step 503: The NM sends the service traffic information of the network slice subnet to a DM.

Step 503 may be performed with reference to step 405, and details are not described herein again.

Step 504: The DM receives the service traffic information of the network slice subnet from the NM, and manages the network slice subnet based on the service traffic information of the network slice subnet.

Step 504 may be performed with reference to step 406, and details are not described herein again.

Compared with the prior art, in the solution shown in FIG. 5, the NM and the DM are separately configured to deploy the network slice subnet or select the available network slice subnet in the existing network. A device performs auto-management on the network slice in real time based on the service traffic information. This replaces the manual process of off-line network planning, improves efficiency in deploying the network slice, and reduces the on-boarding time of a service.

FIG. 6 shows yet another method for deploying a network slice according to an embodiment of the present disclosure. The method may include the following steps.

Step 601: An SMF receives a service management request message.

For a performing process and the service management request message in step 601, refer to related descriptions in step 401, and details are not described herein again.

Step 602: The SMF determines the service traffic information of a network slice based on the received service management request message.

Step 602 may be performed with reference to step 402, for the service traffic information of the network slice, refer to related descriptions in step 301, and details are not described herein again.

Step 603: The SMF sends the service traffic information of the network slice to a first NM.

For a performing process of step 603, refer to step 403, and details are not described herein again.

Step 604: The first NM receives the service traffic information of the network slice from the SMF, and sends the service traffic information of the network slice to a second NM.

The service traffic information that is sent by the first NM to the second NM and that is of the network slice may be the service traffic information that is received by the first NM and that is of the network slice, or may be decomposed service traffic information that is of a second network slice and that is determined by the first NM based on the received service traffic information of the network slice. This is not limited hereto in this embodiment of the present disclosure.

Step 605: The second NM receives the service traffic information of the network slice from the first NM, and determines the service traffic information of a network slice subnet based on the service traffic information of the network slice.

That the first NM determines service traffic information of a network slice subnet based on the service traffic information of the network slice in step 605 may be performed with reference to step 404, and details are not described herein again.

Step 606: The second NM sends the service traffic information of the network slice subnet to a DM.

Step 606 may be performed with reference to step 405, and details are not described herein again.

Step 607: The DM receives the service traffic information of the network slice subnet from the second NM, and manages the network slice subnet based on the service traffic information of the network slice subnet.

Step 607 may be performed with reference to step 406, and details are not described herein again.

It should be noted that in the solution shown in FIG. 4, to reduce signaling exchange between function units, the foregoing steps 603 to 607 may be replaced by: The SMF deploys, based on the service traffic information of the network slice, the network slice or selects the available network slice in the existing network. For a manner in which the SMF deploys, based on the service traffic information of the network slice, the network slice or selects the available network slice in the existing network, refer to the manner in which the NM deploys, based on the service traffic information of the network slice, the network slice or selects the available network slice in the existing network. Details are not described herein again.

Alternatively, the foregoing steps 605 to 607 may be replaced by: The second NM deploys, based on the service traffic information of the network slice, the network slice or selects the available network slice in the existing network. For a manner in which the second NM deploys, based on the service traffic information of the network slice, the network slice or selects the available network slice in the existing network, refer to related descriptions in step 302, and details are not described herein again.

Alternatively, the foregoing steps 605 to 607 may be replaced by: The second NM receives the service traffic information of the network slice from the first NM, the second NM sends the service traffic information of the network slice to the DM, and the DM deploys, based on the received service traffic information of the network slice, the network slice or selects the available network slice in the existing network. For a manner in which the DM deploys, based on the service traffic information of the network slice, the network slice or selects the available network slice in the existing network, refer to the manner, in FIG. 3, in which the NM deploys, based on the service traffic information of the network slice, the network slice or selects the available network slice in the existing network, and details are not described herein again.

Compared with the prior art, in the solution shown in FIG. 6, the SMF, the first NM, the second NM, and the DM are mutually configured to deploy the network slice subnet or select the available network slice subnet in the existing network. A device performs auto-management on the network slice in real time based on the service traffic information, which prevents a process of manually off-line network planning, improves efficiency in deploying the network slice, and reduces on-boarding time of a service.

The foregoing mainly describes, from the perspective of interaction between nodes, the solutions provided in the embodiments of the present disclosure. It can be understood that to implement the foregoing functions, each node, such as the SMF, the NM, and the DM, includes a corresponding hardware structure and/or a software module for performing each function. A person skilled in the art should easily be aware that in combination with the examples of the algorithms steps described in the embodiments disclosed in this specification, the present disclosure may be implemented by hardware or a combination of hardware and computer software. Whether a function is performed by hardware or computer software driving hardware depends on particular applications and design constraints of the technical solutions. Persons skilled in the art can use different methods to implement the described functions for each particular application, but it should not be considered that the implementation goes beyond the scope of the embodiments of the present disclosure.

In the embodiments of the present disclosure, the function modules of the SMF, the NM, and the DM may be divided based on the foregoing method examples. For example, the function modules may be divided corresponding to the functions, or two or more functions may be integrated into one processing module. The foregoing integrated module may be implemented in a hardware form or a software function module form. It should be noted that the module division in the embodiments of the present disclosure is an example, and is merely logical function division. There may be another division manner in an actual implementation.

Figure 7:
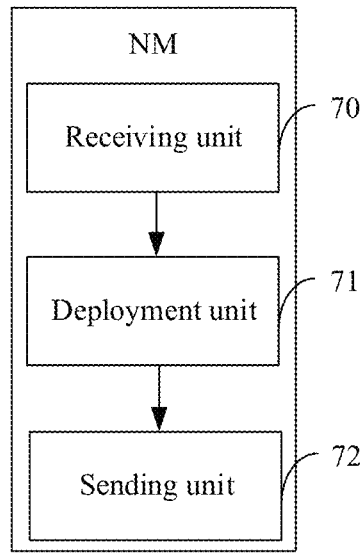
FIG. 7 is a schematic composition diagram of an NM according to an embodiment of the present disclosure.

When the function modules are divided corresponding to the functions, FIG. 7 is a possible schematic composition diagram of an NM, and the NM may be configured to perform the functions of the NM that are related in the foregoing embodiments. As shown in FIG. 7, the NM may include a receiving unit 70, a deployment unit 71, and a sending unit 72.

The receiving unit 70 is configured to support the NM in performing step 301, step 404, step 502, and step 605.

The deployment unit 71 is configured to support the NM in performing step 302, step 404, step 502, and step 605.

The sending unit 72 is configured to support the NM in performing step 405, step 503, and step 606.

It should be noted that for functional descriptions of a corresponding function module, refer to all related content of the steps in the foregoing method embodiments, and details are not described herein again. The NM provided in this embodiment of the present disclosure is configured to perform the method for deploying a network slice, and therefore can achieve the same effect as that of the foregoing method for deploying a network slice.

Figure 8:
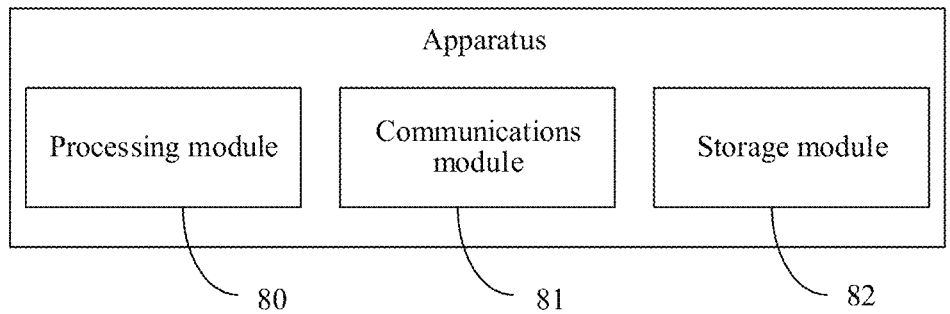
FIG. 8 is a schematic composition diagram of an apparatus according to an embodiment of the present disclosure.

When integrated units are used, FIG. 8 shows an apparatus. The apparatus is shown as a chip, and is configured to perform the functions of the NM in the foregoing embodiments. As shown in FIG. 8, the apparatus may include a processing module 80 and a communications module 81.

The processing module 80 is configured to control and manage the actions of the apparatus. For example, the processing module 80 is configured to support the apparatus in performing step 302, step 404, step 502, and step 605 and/or other processes used for the technology described in this specification. The communications module 81 is configured to support communication between the apparatus and another network entity, for example, communication between the apparatus and the function module or the network entity shown in FIG. 1. The apparatus may further include a storage module 82 that is configured to store program code and data that are of the apparatus.

The processing module 80 may be a processor or a controller. The processing module 80 may implement or execute various exemplary logical blocks, modules, and circuits described with reference to content disclosed in the present disclosure. The processor may also be a combination that implements a computing function, for example, including a combination of one or more microprocessors, a combination of a DSP and a microprocessor, or the like. The communications module 81 may be a communications interface, a transceiver circuit, a communications interface, or the like. The storage module 82 may be a memory.

When the processing module 80 is a processor, the communications module 81 is a communications interface, and the storage module 82 is a memory, the apparatus related in an embodiment of the present disclosure may be the apparatus shown in FIG. 2.

Figure 9:
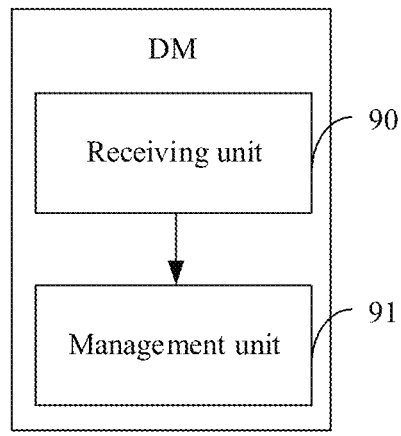
FIG. 9 is a schematic composition diagram of a DM according to an embodiment of the present disclosure.

When the function modules are divided corresponding to the functions, FIG. 9 is a possible schematic composition diagram of a DM, and the DM may be configured to perform the functions of the DM that are related in the foregoing embodiments. As shown in FIG. 9, the DM may include a receiving unit 90 and a management unit 91.

The receiving unit 90 is configured to support the DM in performing step 406, step 504, and step 607.

The management unit 91 is configured to support the DM in performing step 406, step 504, and step 607.

It should be noted that for the functional description of a corresponding function module, refer to all related content of the steps in the foregoing method embodiments, and details are not described herein again. The DM provided in an embodiment of the present disclosure is configured to perform the foregoing method for deploying a network slice, and therefore can reach the same effect as that of the foregoing method for deploying a network slice.

Figure 10:
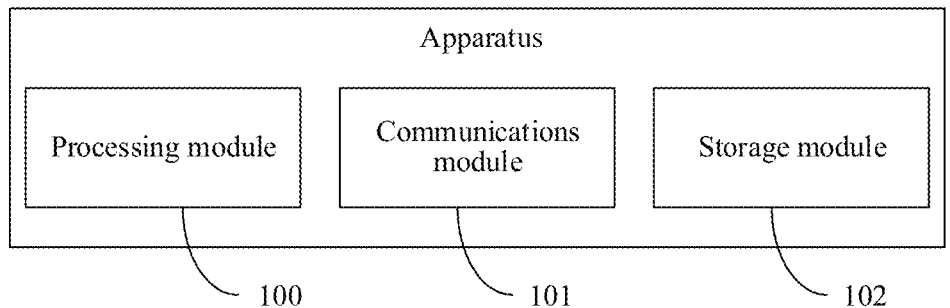
FIG. 10 is a schematic composition diagram of an apparatus according to an embodiment of the present disclosure.

When integrated units are used, FIG. 10 shows an apparatus. The apparatus exists as a product form of a chip, and the apparatus is configured to perform the functions of the DM in the foregoing embodiments. As shown in FIG. 10, the apparatus may include: a processing module 100 and a communications module 101.

The processing module 100 is configured to control and manage the actions of the apparatus. For example, the processing module 100 is configured to support the apparatus in performing step 406, step 504, and step 607 and/or other processes used for the technology described in this specification. The communications module 101 is configured to support communication between the apparatus and another network entity, for example, communication between the apparatus and the function module or the network entity shown in FIG. 1. The apparatus may further include a storage module 102 that is configured to store program code and data.

The processing module 100 may be a processor or a controller. The processing module 100 may implement or execute various exemplary logical blocks, modules, and circuits described with reference to content disclosed in the present disclosure. The processor may also be a combination that implements a computing function, for example, including a combination of one or more microprocessors, a combination of a DSP and a microprocessor, or the like. The communications module 101 may be a communications interface, a transceiver circuit, a communications interface, or the like. The storage module 102 may be a memory.

When the processing module 100 is a processor, the communications module 101 is a communications interface, and the storage module 102 is a memory, the apparatus related in an embodiment of the present disclosure may be the apparatus shown in FIG. 2.

Figure 11:
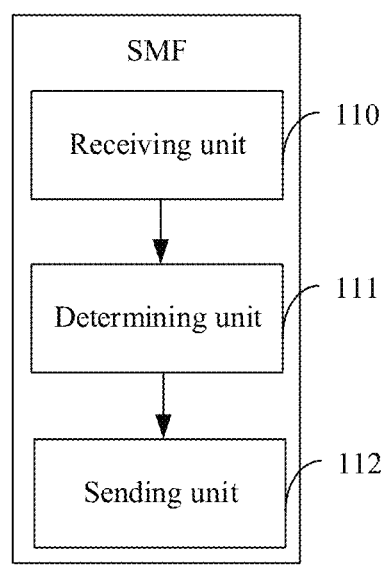
FIG. 11 is a schematic composition diagram of an SMF according to an embodiment of the present disclosure.

When the function modules are divided according to the functions, FIG. 11 is a possible schematic structural diagram of an SMF. As shown in FIG. 11, the SMF may include: a receiving unit 110, a determining unit 111, and a sending unit 112.

The receiving unit 110 is configured to support the SMF in performing step 401 and step 601.

The determining unit 111 is configured to support the SMF in performing step 402 and step 602.

The sending unit 112 is configured to support the SMF in performing step 403 and step 603.

It should be noted that for the functional descriptions of a corresponding function module, refer to all related content of the steps in the foregoing method embodiments, and details are not described herein again. The SMF provided in this embodiment of the present disclosure is configured to perform the foregoing method for deploying a network slice, and therefore can achieve the same effect as that of the foregoing method for deploying a network slice.

Figure 12:
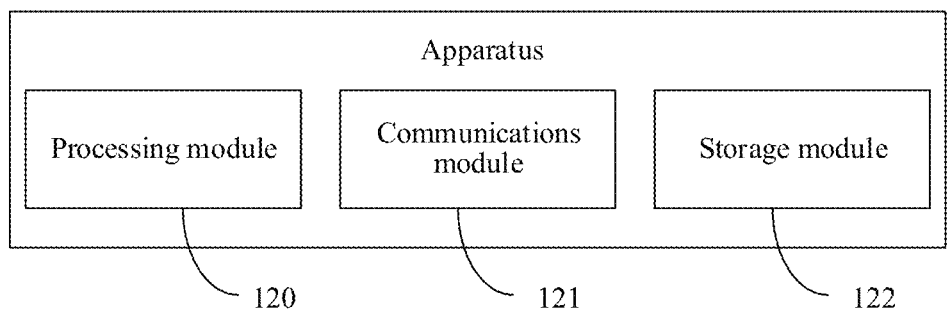
FIG. 12 is a schematic composition diagram of an apparatus according to an embodiment of the present disclosure.

When integrated units are used, FIG. 12 shows an apparatus. The apparatus is presented as a chip, and the apparatus is configured to perform the functions of the SMF in the foregoing embodiments. As shown in FIG. 12, the apparatus may include: a processing module 120 and a communications module 121.

The processing module 120 is configured to control and manage the actions of the apparatus. For example, the processing module 120 is configured to support the apparatus in performing step 402 and step 602. The communications module 121 is configured to support communication between the apparatus and another network entity, for example, communication between the apparatus and the function module or the network entity shown in FIG. 1. The apparatus may further include a storage module 122 that is configured to store program code and data.

The processing module 120 may be a processor or a controller. The processing module 120 may implement or execute various exemplary logical blocks, modules, and circuits described with reference to the content disclosed in the present disclosure. The processor may also be a combination that implements a computing function, for example, a combination of one or more microprocessors, a combination of a DSP and a microprocessor, or the like. The communications module 121 may be a communications interface, a transceiver circuit, a communications interface, or the like. The storage module 122 may be a memory.

When the processing module 120 is a processor, the communications module 121 is a communications interface, and the storage module 122 is a memory, the apparatus related in an embodiment of the present disclosure may be the apparatus shown in FIG. 2.

The foregoing descriptions about implementations allow a person skilled in the art to understand that, for the purpose of convenient and brief description, division of the foregoing function modules is used as an example for description. In actual applications, the foregoing functions can be allocated to different function modules and implemented according to a requirement, that is, an inner structure of an apparatus is divided into different function modules to implement all or some of the functions described above.

In the plurality of embodiments provided in this application, it should be understood that the disclosed apparatus and method may be implemented in other manners. For example, the described apparatus embodiment is merely exemplary. For example, the module or unit division is merely logical function division and may be other division manners in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units may be integrated into one unit. The foregoing integrated unit can be implemented in a form of hardware, or can be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present disclosure essentially, or the part contributing to the prior art, or all or some of the technical solutions may be presented in the form of a software product. The software product is stored in a storage medium and includes several instructions for enabling a device (may be a single-chip microcomputer, a chip, or the like) or a processor to perform all or some of the steps of the methods described in all the embodiments of the present disclosure. The foregoing storage medium includes: any medium that can store program code, such as a USB flash drive, a removable hard disk, a ROM, a RAM, a magnetic disk, an optical disc, or the like.

The foregoing descriptions are merely specific embodiments of the present disclosure, but are not intended to limit the protection scope of the present disclosure. Any variation or replacement disclosed in the present disclosure shall fall within the protection scope of the present disclosure. Therefore, the protection scope of the present disclosure shall be subject to the protection scope of the claims.

What is claimed is:

1. A communication method, comprising:
    receiving a network slice management request message, wherein the network slice management request message carries service traffic information of a network slice, wherein the service traffic information of the network slice comprises the following:
        an activation ratio, wherein the activation ratio is a ratio of a quantity of terminal devices in an activated state to a total quantity of terminal devices; and
        a moving level of terminal devices, wherein the moving level of the terminal devices includes one or more of the following: fast speed, middle speed, low speed, or non-moving;
    determining service traffic information of a network slice subnet based on the service traffic information of the network slice, wherein the network slice comprises the network slice subnet; and
    sending the service traffic information of the network slice subnet to a domain management unit.

2. The method according to claim 1, wherein the service traffic information of the network slice further comprises at least one from the following:
    the total quantity of terminal devices; or
    a coverage of a service.

3. The method according to claim 1, further comprising:
    receiving the service traffic information of the network slice from a service management unit; or receiving the service traffic information of the network slice from a tenant.

4. The method according to claim 1, wherein an activation ratio in the network slice subnet is the same as the activation ratio in the network slice; or
    a moving level of terminal devices in the network slice subnet is non-moving, and the moving level of terminal devices in the network slice is non-moving.

5. A communication method, comprising:
    receiving service traffic information of a network slice subnet, wherein the service traffic information of the network slice subnet comprises the following:
        an activation ratio, wherein the activation ratio is a ratio of a quantity of terminal devices in an activated state to a total quantity of terminal devices; and
        a moving level of terminal devices, wherein the moving level of the terminal devices includes one or more of the following: fast speed, middle speed, low speed, or non-moving; and
    creating the network slice subnet based on the service traffic information of the network slice subnet or selecting a network slice subnet in the existing network based on the service traffic information of the network slice subnet.

6. The method according to claim 5, wherein the service traffic information of the network slice subnet further comprises at least one from the following:
    the total quantity of terminal devices; or
    a coverage of a service.

7. The method according to claim 5, wherein an activation ratio in the network slice subnet is the same as the activation ratio in the network slice; or
    a moving level of terminal devices in the network slice subnet is non-moving, and the moving level of terminal devices in the network slice is non-moving.

8. An apparatus, comprising:
    at least one processor; and
    a memory coupled to the at least one processor and having program instructions stored thereon which, when executed by the at least one processor, cause the apparatus to:
    receive a network slice management request message, wherein the network slice management request message carries service traffic information of a network slice, wherein the service traffic information of the network slice comprises the following:
        an activation ratio, wherein the activation ratio is a ratio of a quantity of terminal devices in an activated state to a total quantity of terminal devices; and
        a moving level of terminal devices, wherein the moving level of the terminal devices includes one or more of the following: fast speed, middle speed, low speed, or non-moving;
    determine service traffic information of a network slice subnet based on the service traffic information of the network slice, wherein the network slice comprises the network slice subnet; and
    send the service traffic information of the network slice subnet to a domain management unit.

9. The apparatus according to claim 8, wherein the service traffic information of the network slice further comprises at least one from the following:
the total quantity of terminal devices; or
a coverage of a service.

10. The apparatus according to claim 8, the program instructions further cause the apparatus to:
receive the service traffic information of the network slice from a service management unit; or
receive the service traffic information of the network slice from a tenant.

11. The apparatus according to claim 8, wherein an activation ratio in the network slice subnet is the same as the activation ratio in the network slice; or
a moving level of terminal devices in the network slice subnet is non-moving, and the moving level of terminal devices in the network slice is non-moving.

12. An apparatus, comprising:
at least one processor; and
a memory coupled to the at least one processor and having program instructions stored thereon which, when executed by the at least one processor, cause the apparatus to:
receive service traffic information of a network slice subnet, wherein the service traffic information of the network slice subnet comprises the following:
an activation ratio, wherein the activation ratio is a ratio of a quantity of terminal devices in an activated state to a total quantity of terminal devices; and
a moving level of terminal devices, wherein the moving level of the terminal devices includes one or more of the following: fast speed, middle speed, low speed, or non-moving;
and
create the network slice subnet based on the service traffic information of the network slice subnet or select a network slice subnet in the existing network based on the service traffic information of the network slice subnet.

13. The apparatus according to claim 12, wherein the service traffic information of the network slice subnet further comprises at least one from the following:
the total quantity of terminal devices; or
a coverage of a service.

14. The apparatus according to claim 13, wherein an activation ratio of terminal devices in the network slice subnet is the same as the activation ratio of terminal devices in the network slice; or
a moving level of terminal devices in the network slice subnet is non-moving, and the moving level of terminal devices in the network slice is non-moving.

15. A communication method, comprising:
receiving, by a first apparatus, a network slice management request message, wherein the network slice management request message carries service traffic information of a network slice, wherein the service traffic information of the network slice comprises the following:
an activation ratio, wherein the activation ratio is a ratio of a quantity of terminal devices in an activated state to a total quantity of terminal devices; and
a moving level of terminal devices, wherein the moving level of the terminal devices indicates one or more of the following: fast speed, middle speed, low speed, or non-moving;
determining, by the first apparatus, service traffic information of a network slice subnet based on the service traffic information of the network slice, wherein the network slice comprises the network slice subnet; and
sending, by the first apparatus, the service traffic information of the network slice subnet to a domain management unit; and
receiving, by a second apparatus, the service traffic information of the network slice subnet.

16. The method according to claim 15, wherein the service traffic information of the network slice further comprises at least one from the following:
the total quantity of terminal devices; or
a coverage of a service.

17. The method according to claim 15, wherein an activation ratio of terminal devices in the network slice subnet is the same as the activation ratio of terminal devices in the network slice; or
a moving level of terminal devices in the network slice subnet is non-moving, and the moving level of terminal devices in the network slice is non-moving.

18. A communication system, comprising:
a first apparatus configured to:
receive a network slice management request message, wherein the network slice management request message carries service traffic information of a network slice, wherein the service traffic information of the network slice comprises the following:
an activation ratio, wherein the activation ratio is a ratio of a quantity of terminal devices in an activated state to a total quantity of terminal devices; and
a moving level of terminal devices, wherein the moving level of the terminal devices indicates one or more of the following: fast speed, middle speed, low speed, or non-moving;
determine service traffic information of a network slice subnet based on the service traffic information of the network slice, wherein the network slice comprises the network slice subnet; and
send the service traffic information of the network slice subnet to a domain management unit; and
a second apparatus configured to:
receive the service traffic information of the network slice subnet.

19. The system according to claim 18, wherein the service traffic information of the network slice further comprises at least one from the following:
the total quantity of terminal devices; or
a coverage of a service.

20. The system according to claim 18, wherein an activation ratio in the network slice subnet is the same as the activation ratio in the network slice; or
a moving level of terminal devices in the network slice subnet is non-moving, and the moving level of terminal devices in the network slice is non-moving.

* * * * *